US007254777B2

(12) United States Patent
Hayes et al.

(10) Patent No.: US 7,254,777 B2
(45) Date of Patent: Aug. 7, 2007

(54) SYSTEM AND METHOD FOR CONTROLLING THE RECORDING FUNCTIONALITY OF AN APPLIANCE USING A PROGRAM GUIDE

(75) Inventors: Patrick H. Hayes, Mission Viejo, CA (US); Paul D. Arling, Irvine, CA (US); Robert P. Lilleness, Newport Beach, CA (US)

(73) Assignee: Universal Electronics Inc., Cypress, CA (US)

( * ) Notice: Subject to any disclaimer, the term of this patent is extended or adjusted under 35 U.S.C. 154(b) by 608 days.

(21) Appl. No.: 10/287,411

(22) Filed: Nov. 4, 2002

(65) Prior Publication Data
US 2003/0193519 A1  Oct. 16, 2003

Related U.S. Application Data

(60) Provisional application No. 60/372,874, filed on Apr. 15, 2002, provisional application No. 60/344,020, filed on Dec. 20, 2001.

(51) Int. Cl.
*G06F 15/00* (2006.01)
*G06F 13/00* (2006.01)

(52) U.S. Cl. .................. 715/734; 715/884; 345/156

(58) Field of Classification Search ............... 345/769, 345/156, 169; 348/734; 725/44; 715/765, 715/156, 763, 725, 727, 740, 853, 738, 864, 715/716, 734, 884, 764, 767
See application file for complete search history.

(56) References Cited

U.S. PATENT DOCUMENTS

| 4,894,789 | A | 1/1990 | Yee |
| 5,005,084 | A | 4/1991 | Skinner |
| 5,293,357 | A | 3/1994 | Hallenbeck |
| 5,307,055 | A | 4/1994 | Baskin et al. |
| 5,410,326 | A | 4/1995 | Goldstein |
| 5,565,888 | A | 10/1996 | Selker |
| 5,574,964 | A | 11/1996 | Hamlin |

(Continued)

FOREIGN PATENT DOCUMENTS

EP  0561435 A2  9/1993

(Continued)

OTHER PUBLICATIONS

PRONTO User Guide, Universal Electronics Inc., 1999, pp. 1-56.

*Primary Examiner*—Cao (Kevin) Nguyen
(74) *Attorney, Agent, or Firm*—Gary R. Jarosik (57) ABSTRACT

A system and method for displaying an electronic program guide and for remotely controlling the recording functionality of an appliance. A user registers with a Web site to enable the downloading of an electronic program guide ("EPG") to a portable device. The downloaded and displayable EPG includes a listing of programs from which the user may select a program of interest. In response to receiving input from the user requesting that the program be recorded, data indicative of the recording request is stored in the portable device. Then, when it is determined that the portable device is able to establish communication with the appliance (either directly or via an intermediate PC), the data indicative to the recording request is provided to the appliance to effect the recording of the program.

29 Claims, 11 Drawing Sheets

U.S. PATENT DOCUMENTS

| | | | |
|---|---|---|---|
| 5,635,989 A | 6/1997 | Rothmuller | |
| 5,648,760 A | 7/1997 | Kumar | |
| 5,652,613 A | 7/1997 | Lazarus et al. | |
| 5,671,267 A | 9/1997 | August et al. | |
| 5,710,605 A | 1/1998 | Nelson | |
| 5,724,106 A | 3/1998 | Autry et al. | |
| 5,751,372 A | 5/1998 | Forson | |
| 5,761,606 A | 6/1998 | Wolzien | |
| 5,793,438 A | 8/1998 | Bedard | |
| 5,801,787 A | 9/1998 | Schein et al. | |
| 5,828,419 A | 10/1998 | Bruette et al. | |
| 5,835,864 A | 11/1998 | Diehl et al. | |
| 5,838,775 A | 11/1998 | Montalbano | |
| 5,855,006 A | 12/1998 | Huemoeller et al. | |
| 5,900,875 A | 5/1999 | Haitani et al. | |
| 5,901,366 A | 5/1999 | Nakano et al. | |
| 5,915,026 A | 6/1999 | Mankovitz | |
| 5,956,025 A | 9/1999 | Goulden et al. | |
| 5,970,206 A | 10/1999 | Yuen et al. | |
| 5,974,222 A | 10/1999 | Yuen et al. | |
| 6,002,394 A | 12/1999 | Schein et al. | |
| 6,002,450 A | 12/1999 | Darbee et al. | |
| 6,018,372 A | 1/2000 | Etheredge | |
| 6,020,881 A | 2/2000 | Naughton et al. | |
| 6,028,599 A | 2/2000 | Yuen et al. | |
| 6,040,829 A | 3/2000 | Croy et al. | |
| 6,097,441 A | 8/2000 | Allport | |
| 6,104,334 A * | 8/2000 | Allport | 341/175 |
| 6,127,941 A | 10/2000 | Van Ryzin | |
| 6,130,726 A | 10/2000 | Darbee et al. | |
| 6,133,909 A | 10/2000 | Schein et al. | |
| 6,137,549 A | 10/2000 | Rasson et al. | |
| 6,151,059 A | 11/2000 | Schein et al. | |
| 6,172,674 B1 | 1/2001 | Etheredge | |
| 6,177,931 B1 | 1/2001 | Alexander et al. | |
| 6,195,589 B1 | 2/2001 | Ketcham | |
| 6,211,856 B1 | 4/2001 | Choi et al. | |
| 6,219,694 B1 | 4/2001 | Lazaridis et al. | |
| 6,256,019 B1 | 7/2001 | Allport | |
| 6,278,499 B1 | 8/2001 | Darbee et al. | |
| 6,285,357 B1 | 9/2001 | Kushiro et al. | |
| 6,311,329 B1 * | 10/2001 | Terakado et al. | 725/44 |
| 6,341,374 B2 | 1/2002 | Schein et al. | |
| 6,369,840 B1 | 4/2002 | Barnett et al. | |
| 6,408,435 B1 | 6/2002 | Sato | |
| 6,437,836 B1 * | 8/2002 | Huang et al. | 348/734 |
| 6,463,463 B1 | 10/2002 | Godfrey et al. | |
| 6,532,589 B1 | 3/2003 | Proehl et al. | |
| 6,577,350 B1 | 6/2003 | Proehl et al. | |
| 6,670,971 B1 * | 12/2003 | Oral | 345/769 |
| 6,822,661 B2 * | 11/2004 | Sai et al. | 715/716 |

FOREIGN PATENT DOCUMENTS

| | | |
|---|---|---|
| EP | 0967797 A2 | 12/1999 |
| EP | 0987888 A1 | 3/2000 |
| EP | 1204275 A2 | 5/2002 |
| GB | 2343073 A | 4/2000 |
| WO | WO 00/21286 | 4/2000 |
| WO | WO 00/40016 | 7/2000 |
| WO | WO 00/58935 | 10/2000 |
| WO | WO 01/20572 A1 | 3/2001 |

* cited by examiner

SYSTEM AND METHOD FOR CONTROLLING THE RECORDING FUNCTIONALITY OF AN APPLIANCE USING A PROGRAM GUIDE

RELATED APPLICATION INFORMATION

This application claims the benefit of U.S. Provisional Patent Application No. 60/372,874, filed on Apr. 15, 2002, which is incorporated herein by reference in its entirety.

This application claims the benefit of U.S. Provisional Application Ser. No. 60/344,020, filed on Dec. 20, 2001, which is incorporated herein by reference in its entirety.

BACKGROUND OF THE INVENTION

This invention generally relates to electronic portable electronic devices having a display and communication capabilities. Exemplary devices include personal digital assistants ("PDAs"), Web Tablets, touch screen remote controls, lap-top computers, and the like.

In the art it is known to provide a program guide feature whereby data relating to current and/or future programming (television, radio, Internet, or the like) is downloaded into a portable device and stored for later browsing by the user. It is also known to equip such portable devices with the ability to transmit remote control signals (IR or RF) to change channels on a tuning device in response to selection by a consumer of a displayed guide entry. Where program guide data is presented not on the portable device but rather on the TV set of a user, the program information being supplied by a tuning device such as a cable or satellite set-top box, it is also know to provide a feature whereby user selection of a program item which is scheduled to be shown sometime in the future results in the automatic recording of that program. This type of automated recording is accomplished using capabilities that are built-in to the appliance, for example, the capabilities offered by TiVO, Replay TV, Ultimate TV, Keen Media, and others or, for example, by control of the consumer's VCR via an "IR blaster."

SUMMARY OF THE INVENTION

In accordance with the description that follows, a system and method is provided for controlling the recording functionality of an appliance using an electronic program guide displayed on an electronic portable device. As will be appreciated, providing this functionality to a portable device overcomes the disadvantages seen in the prior art resulting from the fact that a consumer user is not necessarily in front of their recording appliance when browsing the program guide information. Rather, the consumer may be in another room, another building (e.g. at work), or even in another city.

To overcome this problem, the system and method described hereinafter will accept the consumer's recording requests, store them, and automatically convey them to a target recording apparatus at a later time when the portable device is able to communicate with the recording appliance. The communication may take the form of docking the portable device with a computer that shares a home network with a network-enabled appliance. e.g., a PVR such as Sonicblue's ReplayTV 4000 brand system; via wireless communication over a Personal Area Network implemented in the consumer's home using, for example, Bluetooth or IEEE 802.11 networking, or via direct interaction with a suitably-equipped target appliance once the portable device and the appliance are in communication range. This communication may also occur in any of the manners described above but using the Internet or PSTN as an intermediary. In this manner, the system and method described hereinafter provides a consumer with the ability to browse and select program material for future recording at any location and have these requests automatically entered into his recording apparatus at some later time when his portable device finds itself able to establish communications with a target recording apparatus.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

A portable device 10 having a universal remote control and program guide application is provided. By way of example, representative platforms for the device 10 include, but are not limited to, devices such as remote controls, lap-top computers, Web Tablets and/or PDAs manufactured by HP/Compaq (such as the iPAQ brand PDA), Palm, Visor, Sony, etc. Thus, a preferred underlying platform includes a processor coupled to a memory system comprising a combination of ROM memory, non-volatile read/write memory, and RAM memory (a memory system); a key matrix in the form of physical buttons; an internal clock and timer; a transmission circuit; a power supply; a touch screen display to provide visible feedback to and accept input from a consumer; and I/O circuitry for allowing the device to exchange communications with an external computer such as server and/or client. Additional input circuitry, such as a barcode reader, may also be utilized.

To control the operation of the device 10, the memory system includes executable instructions that are intended to be executed by the processor. In this manner, the processor may be programmed to control the various electronic components within the device 10, e.g., to monitor power, to cause the transmission of signals, etc. Within the memory system, the ROM portion of memory is preferably used to store fixed programming and data that remains unchanged for the life of the product. The nonvolatile read/write memory, which may be FLASH, EEPROM, battery-backed up RAM, "Smart Card," memory stick, or the like, is preferably provided to store consumer entered setup data and parameters, downloaded data, etc., as necessary. RAM memory may be used by the processor for working storage as well as to hold data items which, by virtue of being backed up or duplicated on an external computer (for example, a client device) are not required to survive loss of battery power. While the described memory system comprises all three classes of memory, it will be appreciated that, in general, the memory system can be comprised of any type of computer-readable media, such as ROM, RAM, SRAM, FLASH, EEPROM, or the like in combination. Preferably, however, at least part of the memory system should be non-volatile or battery backed such that basic setup parameters and operating features will survive loss of battery power. In addition, such memories may take the form of a chip, a hard disk, a magnetic disk, and/or an optical disk without limitation.

For commanding the operation of appliances of different makes, models, and types, the memory system may also include a command code library. The command code library is comprised of a plurality of command codes that may be transmitted from the device 10 under the direction of the remote control application for the purpose of controlling the operation of an appliance. The memory system may also includes instructions which the processor uses in connection with the transmission circuit to cause the command codes to be transmitted in a format recognized by an identified appliance. While the transmission circuit preferably utilizes infrared transmissions, it will be appreciated that other forms of wired or wireless transmissions, such as radio frequency, may also be used.

To identify appliances by type and make (and sometimes model) such that the remote control application of the device 10 is adapted to cause the transmission of command codes in the format appropriate for such identified appliances, information may be entered into the device 10. Since methods for setting up a remote control application to cause the transmissions of commands to control the operation of specific appliances are well-known, they will not be described in greater detail herein. Nevertheless, for additional details pertaining to remote control application setup, the reader may turn to U.S. Application No. 60/344,020 and U.S. Pat. Nos. 6,225,938, 4,623,887, 5,872,562, 5,614,906, 4,959,810, 4,774,511, and 4,703,359 which are incorporated herein by reference in their entirety. It should also be appreciated that these set-up methods may be used to configure a personal computer to communicate with a home appliance, for example, if the personal computer is anticipated to use wireless communications to command the operation of appliances in a home entertainment network such as described below.

To cause the device 10 to perform an action, the device 10 is adapted to be responsive to events, such as a sensed consumer interaction with one or more keys on the key matrix, a sensed consumer interaction with the touch screen display, or a sensed signal from an external source such as a remote computer. In response to an event, appropriate instructions within the memory system are executed. For example, when a hard or soft command key associated with the remote control application is activated on the device 10, the device 10 may read the command code corresponding to the activated command key from the memory system and transmit the command code to an appliance in a format recognizable by the appliance. It will be appreciated that the instructions within the memory system can be used not only to cause the transmission of command codes to appliances but also to perform local operations. While not limiting, local operations that may be performed by the device that are related to the remote control application include favorite channel setup, macro button setup, command function key relocation, etc. Examples of such local operations can be found in U.S. Pat. Nos. 5,481,256, 5,959,751, 6,014,092, which are incorporated herein by reference in their entirety.

As discussed, the platform of the device 10 preferably comprises a general purpose, processor system which is controllable by software. The software may include routines, programs, objects, components, and/or data structures that perform particular tasks that can be viewed as an operating system together with one or more applications. The operating system, such as the "Windows CE" brand operating system or the like, provides an underlying set of management and control functions which are utilized by applications to offer the consumer functions such as calendar, address book, spreadsheet, notepad, Internet browsing, etc., as well as control of appliances. Thus, it is to be understood that applications in addition to or complimentary with the remote control application can also be supported by the device 10 and, as such, in terms of the internal software architecture, the "remote control" application may be but one of several possible applications which may co-exist within the device 10.

In terms of providing operating system functionality, it should also be understood that the demarcation between the portable device 10 and a host/client computer, described in greater detail hereinafter, may vary considerably from product to product. For example, at one extreme the portable device 10 may be nothing more than a slave display and input device in wireless communication with a computer that performs all computational functions. At the other extreme, the portable device 10 may be a fully-functional computer system in its own right complete with local mass storage. It is also to be appreciated that a hardware platform similar to that described above may be used in conjunction with a scaled-down operating system to provide remote control functionality only, i.e., as a standalone application. In all cases, however, the principles expressed herein remain the same.

To provide a means by which an consumer can interact with the device 10, the device 10 is preferably provided with software that implements a graphical user interface. The graphical user interface software may also provide access to additional software, such as a browser application, that is used to display information that may be received from an external computer. Such a graphical user interface system is described in pending U.S. Application Nos. 60/264,767, 60/334,774, and 60/344,020 all of which are incorporated herein by reference in their entirety.

Figure 1:
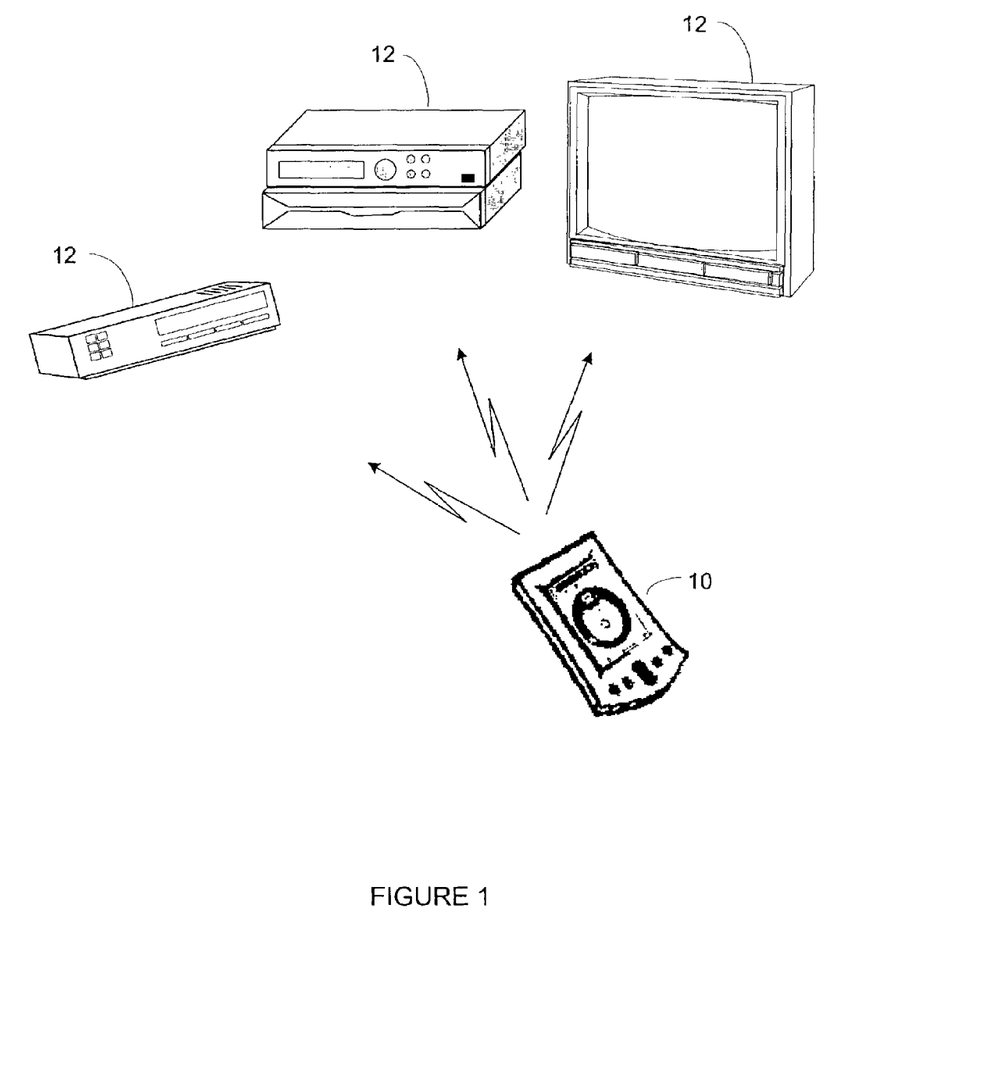
FIG. 1 illustrates an exemplary portable device having a remote control application for use in controlling the operation of home appliances.
Figures 2, 2A, 2B, 2C:
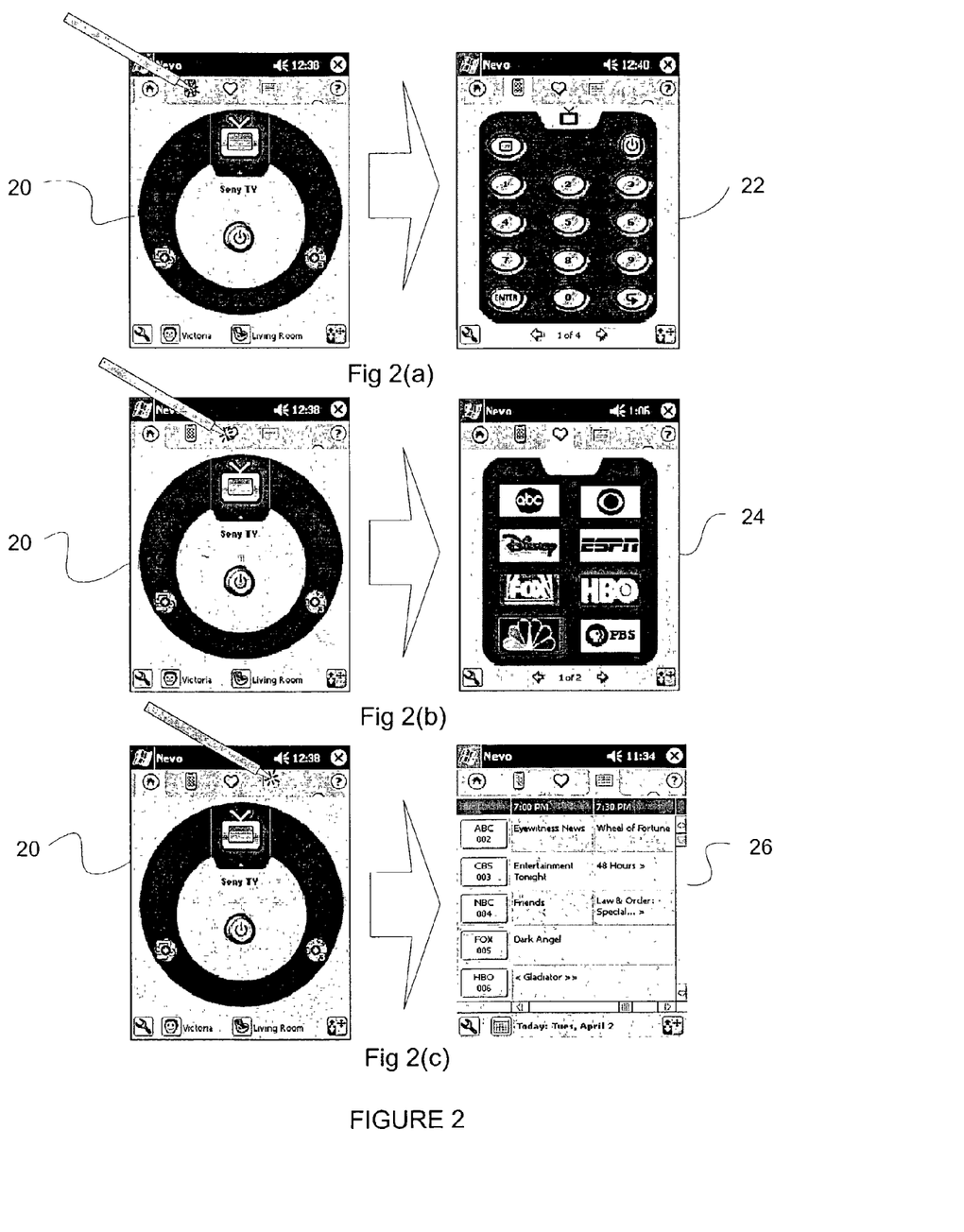
FIG. 2 illustrates exemplary screen shots of a graphical user interface of the portable device of FIG. 1.
Figure 3:
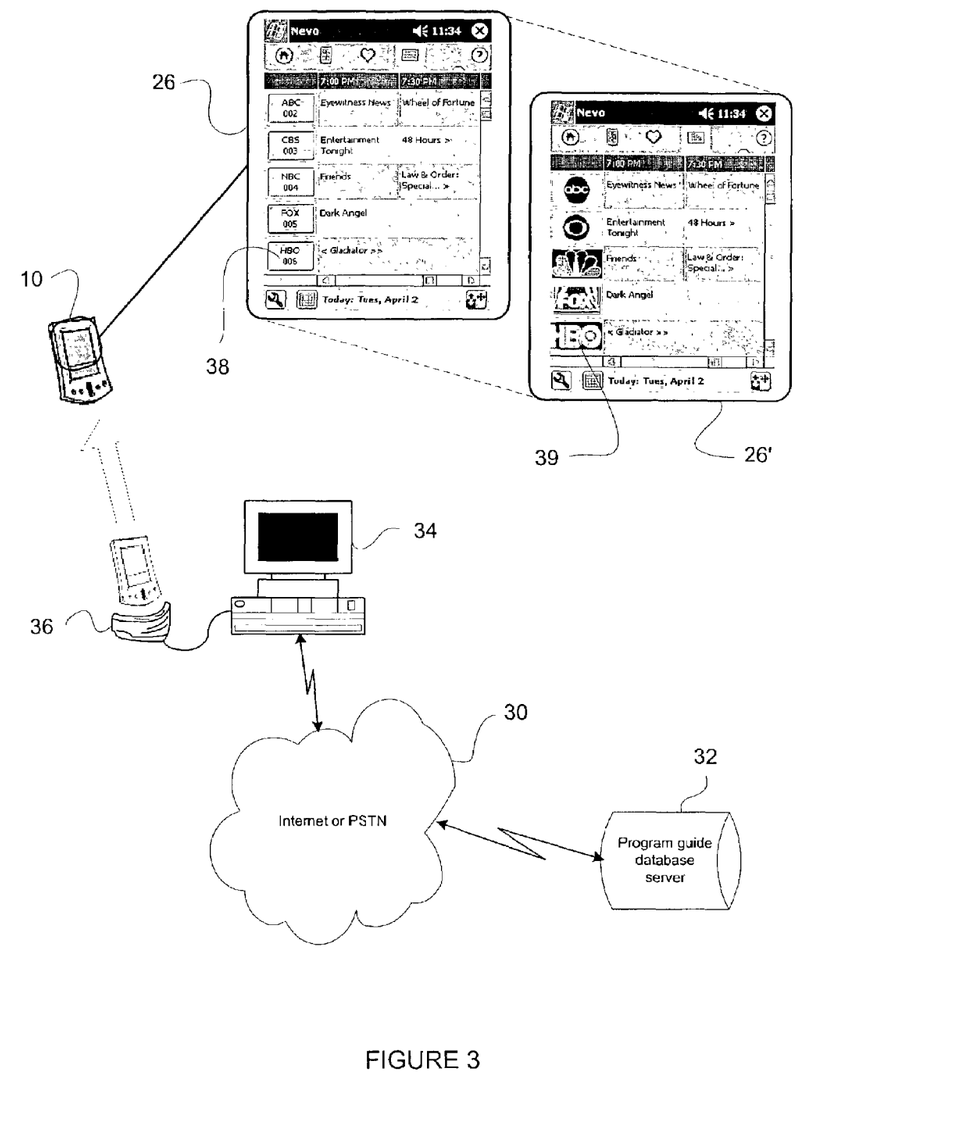
FIG. 3 illustrates an exemplary network by which program guide information is downloadable to the portable device of FIG. 1.

For controlling the operation of one or more consumer appliances 12, as illustrated in FIG. 1, the universal remote control application includes a remote control application. Features offered by the remote control application may include a "home page" 20 from which the user may select various functionalities such as, for example, a device control panel 22, a "Favorites" page 24 (which allows direct tuning to favorite program channels by logo/name), a program guide display 26, etc. as illustrated in FIG. 2. While not intended to be limiting, the program guide may be arranged in a grid having a plurality of cells in which programming information is contained where the cells are arranged in rows corresponding to content providers and columns corresponding to times of day. The program guide display 26 row indicators may be formatted using channel names and/or numbers 38, as illustrated in FIG. 2, or channel logos 39, as illustrated in FIG. 3, to identify soft keys or hard keys (collectively referred to as "buttons") which the consumer may activate in order to have the device 10 transmit the appropriate remote control command(s) to cause an appliance to tune to a channel corresponding to the labeled button. If used, the channel logo graphics may be included as part of downloaded program guide data, as will be described hereinafter, or the graphics may be linked to and derived from the favorite channel display page(s) 24. It will also be appreciated that the program guide display 26 may be arranged in numerical or alphabetical sequence by channel, by favorite channel (in the same sequence as they appear in a favorite channels page 24), by program type or genre, etc.

Data for the program guide display 26 may be obtained over the Internet 30 from a program guide database server 32 using a personal computer 34 and docking station 36 as illustrated in FIG. 3. In such a system, the device 10 is periodically docked with the docking station 36 for file synchronization purposes. Since software for providing such synchronization functionality, e.g., Microsoft's ActiveSync brand synchronization software, is well known and widely used in PDA applications, this functionality will not be discussed in further detail herein.

Figure 4:
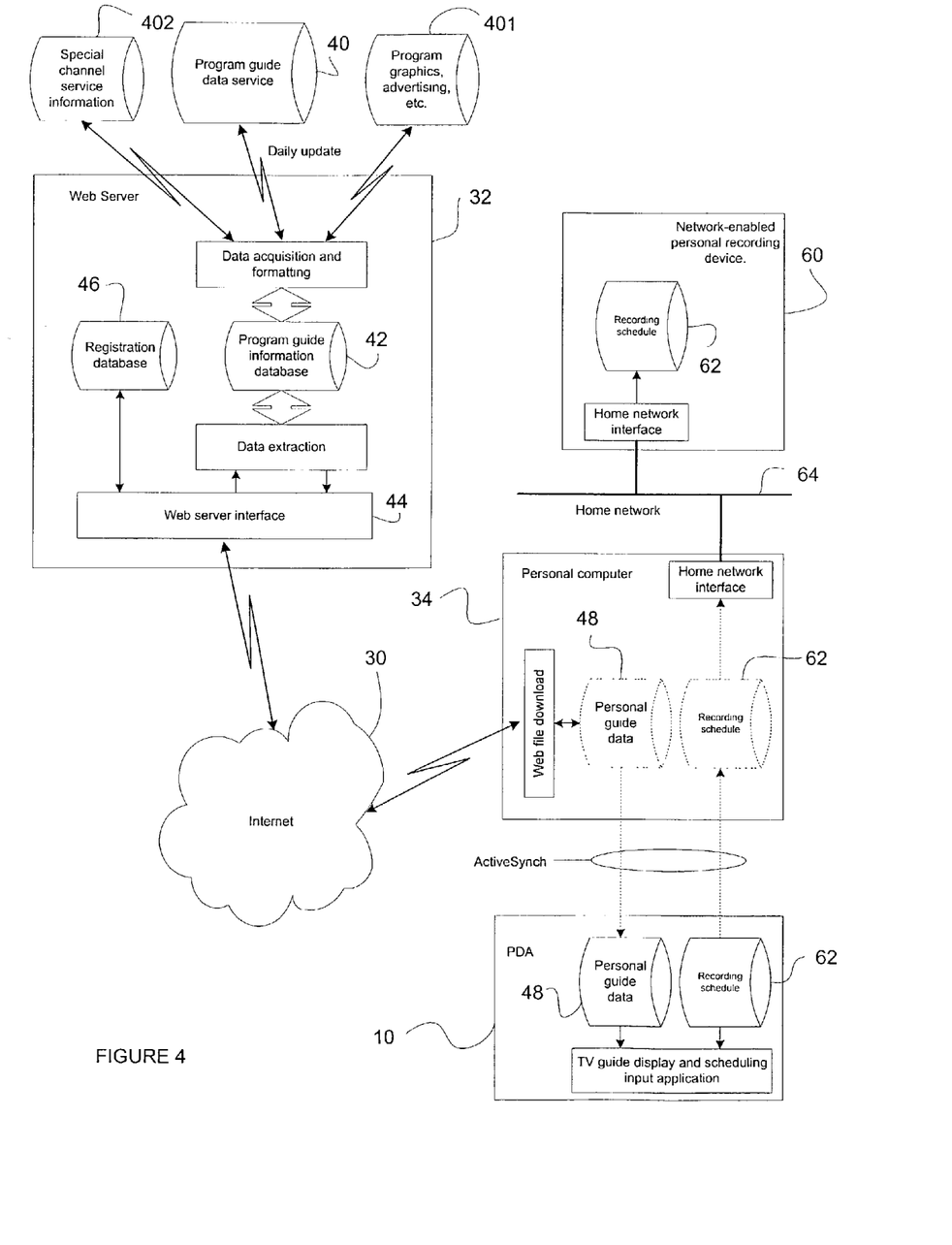
FIG. 4 illustrates a more detailed view of the network illustrated in FIG. 3.

To acquire guide data for use in connection with the remote control application, an exemplary guide data acquisition process is illustrated in FIG. 4. As illustrated, raw program guide data 40 is generally available by subscription from entities such as, for example, Tribune Media Services ("TMS"). A program guide data server 32 is normally configured to access the TMS data on a periodic basis, typically once every 24 hours, after TMS's nightly update is complete. The raw guide data obtained from TMS may then be formatted and stored into a local database 42 associated with the Web server 32. Additional data, such as graphics 401, which may be associated with program descriptions, special service information, and/or advertising 402 (e.g., pay-per view), etc. may also be obtained from third-party sources and combined into the database 42 for later delivery to system users. It should also be appreciated that, while the illustrated examples are in the context of a TV program database sourced from TMS, in practice the programming information stored in the server database 42 may be obtained from several different sources and may span more than one type of programming, for example, radio broadcast information, Webcasts, etc. in addition to or as a substitute for TV schedule information.

Figure 12:
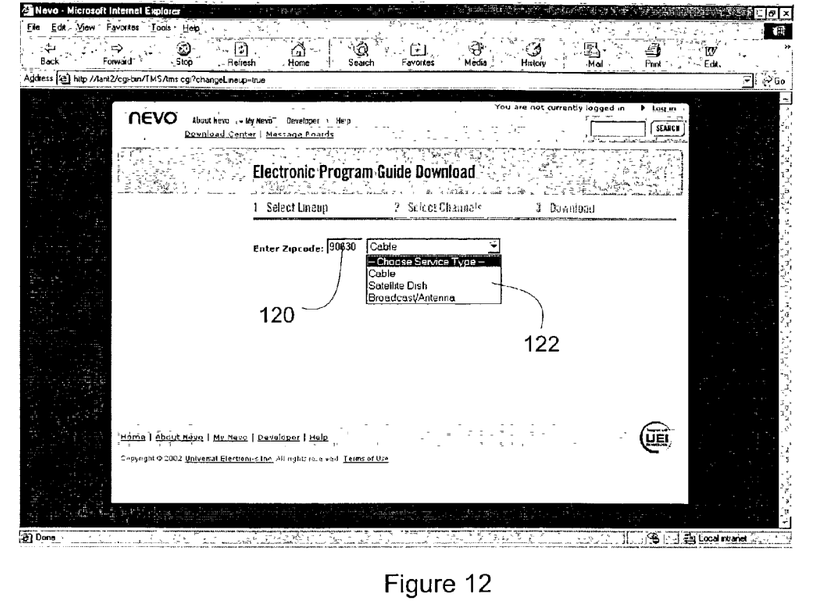
FIGS. 12-14 illustrate exemplary registration screens by which the consumer can specify preferences for a downloaded program guide.
Figure 13:
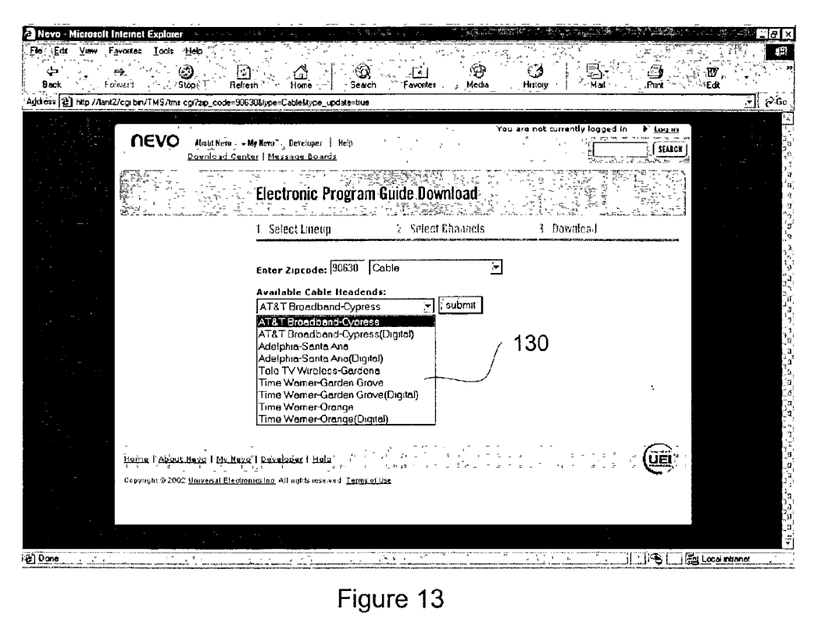
Figure 14:
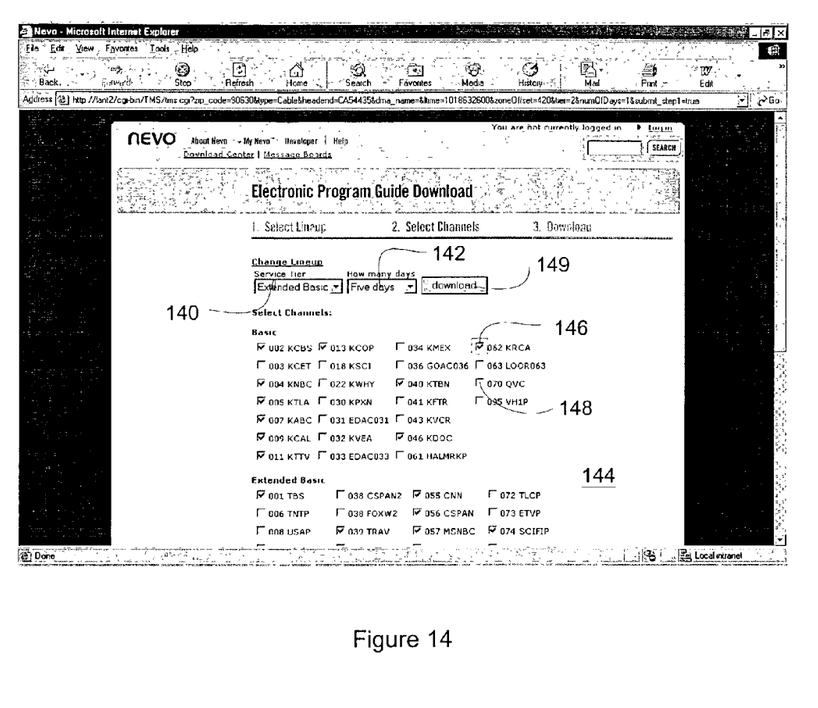

To obtain program guide information, a consumer may log onto the Web server 32 using a personal computer 34 and any standard Web browser such as, for example, Microsoft's Internet Explorer brand Web browser. The Web server 32 identifies the consumer and their preferences via a combination of log-in data stored in a registration database 46 and/or a "cookie" stored on the consumer's local hard drive. Referring to FIGS. 12-14, the first time the consumer accesses the Web server 32 they may be asked to submit information which includes a zip code 120, type of service 122 (e.g., cable, satellite, etc.), service provider 130 (e.g., DirectTV, Cox Cable, etc.) and level of service 140 (e.g., basic, extended basic, premium, etc.). Based on this data, the consumer could be presented with a complete channel line-up 144 for their particular service tier and allowed to select which channels they desire to be included in their guide display. Examples of selected and unselected channels are shown at 146 and 148, respectively, in FIG. 14.

In addition, the consumer may be requested to indicate how many days of programming information 142 the consumer wishes to download in each session. As these latter parameters are changed, an indication of the estimated size of the file to be downloaded may be displayed for the convenience of the consumer. This is particularly advantageous for consumers that have slower, dial-up communication lines with the Web server 32 in that they may determine the extent of the program guide content to download against download time.

The parameters established during this initial interaction with the Web server 32 may then be stored in the registration database/cookie and redisplayed whenever the consumer subsequently accesses the site. Thus, during subsequent visits to the Web server 32, the consumer may accept all the parameter values "as is" or make changes as desired. Certain of these parameters may also be accumulated by the Web server 32 for statistical purposes (e.g., "How may cable subscribers in Irvine Calif. include MTV in their program guide data?"). While described in terms of a consumer manually accessing the Web server 32 using a Web browser to retrieve the guide data, once the initial preference parameters are obtained the process of downloading program guide data may be automated. For example, the consumer's computer 34 can be configured to automatically dial out via a PSTN or Internet at a fixed time every night, at some predetermined time interval, etc. to contact the Web server 32 and retrieve the guide data.

Based on the identity and preferences of a consumer, a Web server interface 44 and related data extraction programs, illustrated in FIG. 4, extract an appropriate subset of the program guide data stored in the database 42 and format this extracted data into a personal guide data file 48 for transfer to the consumer's computer 34 via the Internet 30. The transferred guide data file may include program listing information originating from the program guide data provider 40; supplemental graphics and/or advertising either associated with particular programs or free standing (originating from program graphics provider(s) 401); special channel service information 402 (originating from the service provider of other entities); etc. all of which may be individually tailored to the consumer based on their specified preferences, service type, and/or geographic location. Once located on the consumer's computer 34, the file 48 can be automatically transferred to the device 10 via the synchronization process the next time the device 10 is docked with the computer 34.

The channel guide data downloaded to the portable device 10 may include panels (individual entries), rows (horizontally across the time axis), and/or columns (vertically along the channel axis) and may include advertising or other information interspersed within or overlaying the panels. As noted, advertising or other information data may be inserted by the data extraction program of the Web server 32 based on the preferences of a consumer, the specified service type, the geographic location of the user, and/or data that the service provider desires the consumer to be exposed to. In addition, the guide display application on the portable device 10 may include the ability to lock one or more portions of the guide display to a specific set or group of data. While the locked portions may be unmovable by the consumer from a specified location within the display or may dynamically change location based on the manner that the consumer is interacting with the guide, it is preferred that the locked portion remain visible to the consumer at all times that the guide is being viewed.

Figure 15:
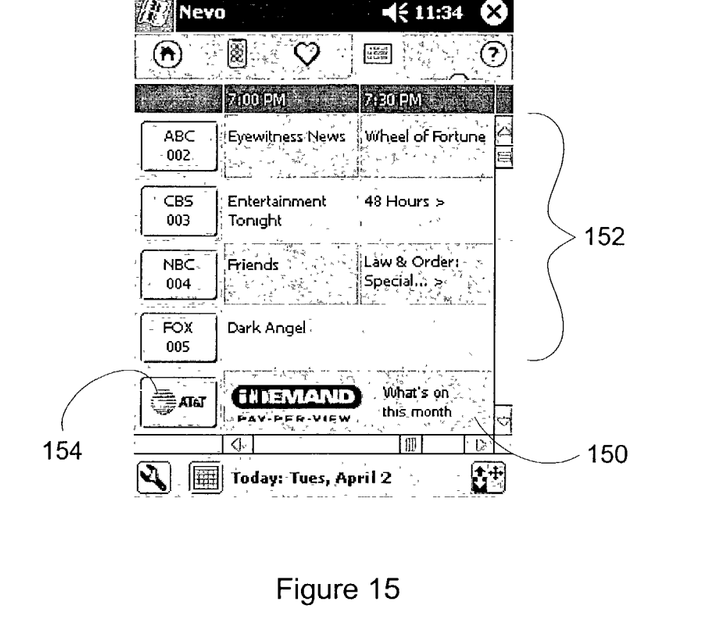
FIGS. 15 and 16 illustrate an exemplary program guide in which a portion of the guide viewing area is locked.

By way of example, referring to FIG. 15, a subscriber to AT&T's digital cable service in zip code area "90630" may receive a guide data file which includes a data block permanently assigning the bottom row 150 of the guide display to a pay-per-view channel. In this example, as the consumer scrolls through the other channel information 152 the display in area 150 remains in a fixed, visible location so that the consumer is constantly able to directly access the "In Demand" pay-per-view preview channel by touching the AT&T logo button 154 (i.e., in response to a selection of the soft key labeled "In Demand" the device 10 will be caused to transmit the commands to access the service).

Figure 16:
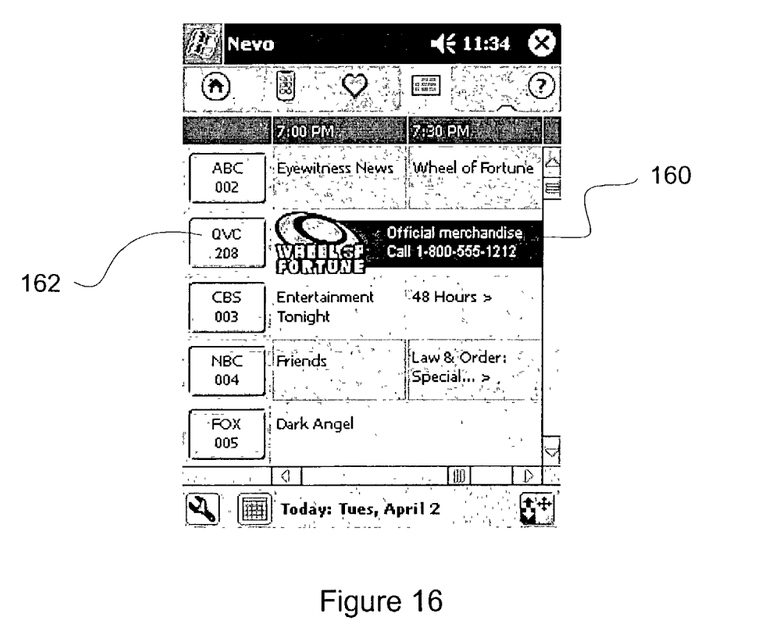

It is to be understood that the fixed portion of the guide 150 need not be used to display only channels and/or program information by may also be used to display other information, such as advertising (e.g., an MSO may place an advertisement for its service into the guide data of consumers that not note subscribe to cable). Furthermore, the content in the fixed portion 150 need not be static and may vary with time or channel. For example, within the fixed portion 150 may appear information advertising a series of specific shows or events, either upcoming or in progress, information advertising goods for sale associated with or related to a particular show or channel, etc. as illustrated in FIG. 16 (e.g., an advertisement 160 for goods associated with a particular television program that is due to air shortly is shown). Still further, this locked portion 150 may be embedded within the guide data to persist over a given time period, for example, thirty minutes before through thirty minutes after a show, or at such other time(s) as the advertiser desires. The fixed portion 150 may be associated with a button 162 to switch to a channel on which more information regarding the merchandise is available, a button to switch an appliance to some other channel, or the button 162 may be omitted all together.

Figure 5:
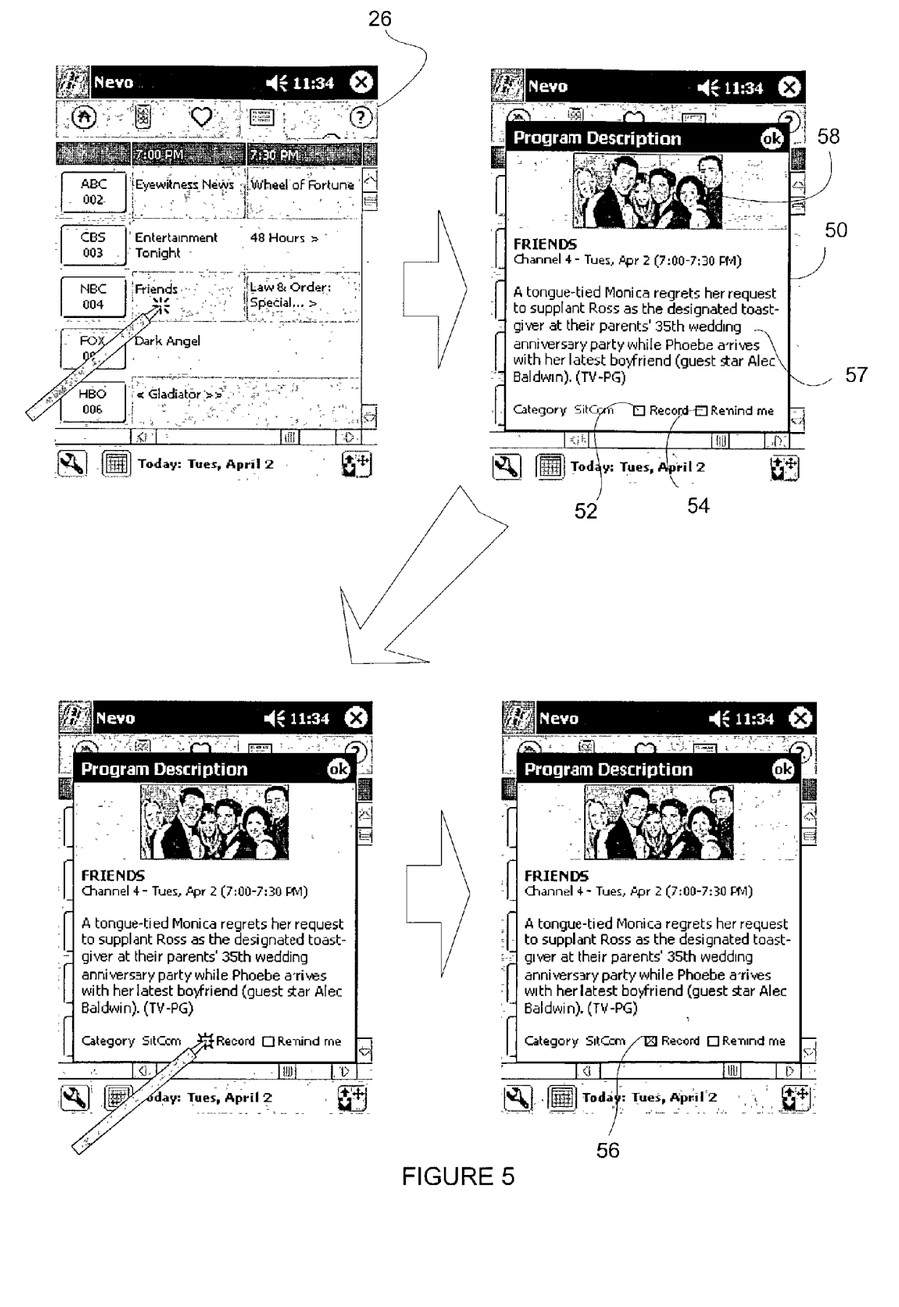
FIG. 5 illustrates exemplary screen shots of a graphical user interface of the portable device of FIG. 1 specifically illustrating interaction with the downloaded program guide information to effect automatic program recording.
Figure 6:
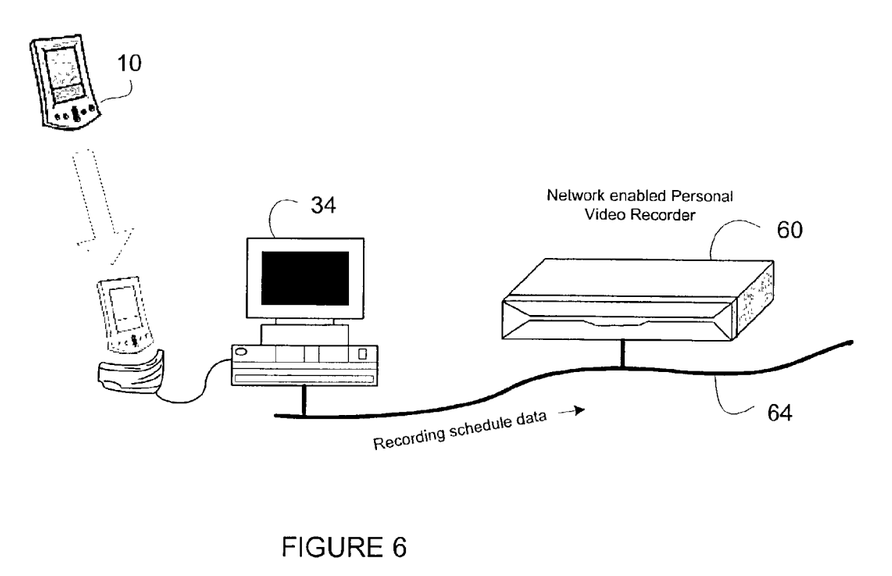
FIGS. 6-11 illustrate exemplary networks by which the portable device of FIG. 1 can be used to automatically enable the recording function of a home appliance.

Turning now to FIG. 5, the program guide display 26 is preferably configured such that, if the consumer touches a particular guide listing, e.g., "Friends," a pop-up window 50 displays additional information regarding the program. The pop-up window 50 may include extended information 57 regarding the program and, in some embodiments, may include supplemental graphics 58 which originated from sources (401, 402) other than the provider of the raw guide data 40. The pop-up window 50 may also include check boxes, or other graphical user interface elements, such as menus or the like, to accept user input. In the illustrated example, a check box 52 and a check box 54, which can be selected using conventional GUI techniques, allow the consumer to either tag the program event for future recording or to create a reminder entry in a calendar application resident of the device 10 and/or computer 34.

By way of example, touching the "Record" check box 52 causes the data regarding this program event (time, channel, duration, etc.) to be entered into a recording schedule data file 62 (shown in FIG. 3) located within the device 10. To confirm the acceptance of the recording request in the data file 63, the appearance of the check box 52 may be caused to change 56. The device 10 may also perform conflict resolution (e.g., to determine if there are any overlapping requests) interactively at this level, or may simply store all requests for later resolution by the recoding device. It will also be appreciated that the data regarding the program event may be stored as described above (date, time, channel) using one or more compressed forms, as pointers into guide database entries in the event the target recording appliance and the portable device 10 use a common data source for guide information, etc. It is also desired to allow the consumer to remove recording request data from the file for example, by returning to a program listing and un-checking the box 52.

In certain embodiments, multiple recording appliances may be supported via multiple recording schedule data files. In this event, the device 10 may be configured to default to a particular device (and its corresponding file) unless specified otherwise by the consumer. To this end, additional check boxes, a pull-down menu, or the like may be provided by which the consumer can specify an intended target device. Thus, while the discussions herein have assumed a single set of recording schedule data, those of skill in the art will appreciated how to easily modify the teachings herein so that multiple devices are supported via additional instances of the data set.

Returning now to FIG. 3, the consumer's computer 34 may also connected to a home network 64 which may be wired or wireless. In such a case, also attached to the home network would be a network-enabled appliance, for example, a ReplayTV 4000 brand personal video recorder ("PVR") from Sonicblue Inc. When the portable device 10 is docked with the computer 34 for file synchronization, not only is any updated guide data 48 transferred from the computer to the device 10, but the contents of the recording schedule request file 62 could be transferred from the device 10 to the computer 34. The recording request data 62 can then be transferred from the computer 34 to the PVR 60 via the home network 64. In this manner, a consumer may browse a device-based program guide and enter recording requests wherever the consumer happens to be located and these requests will be logged and automatically transferred to the recording appliance at a later time.

Figure 7:
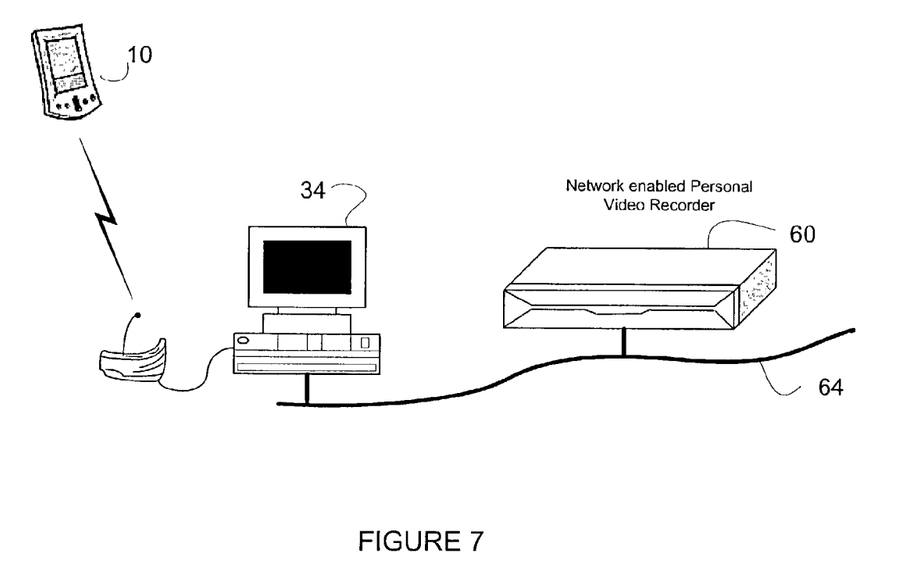
Figure 8:
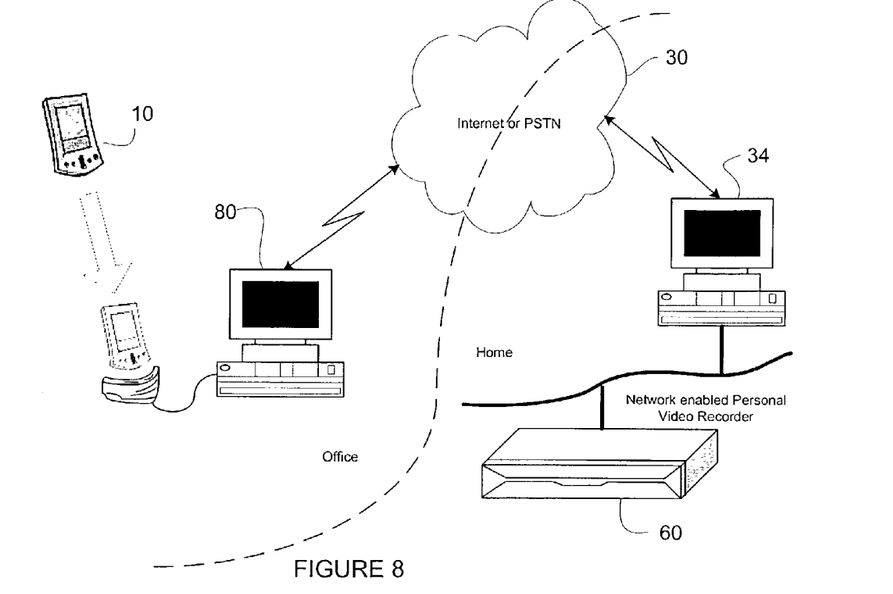
Figure 9:
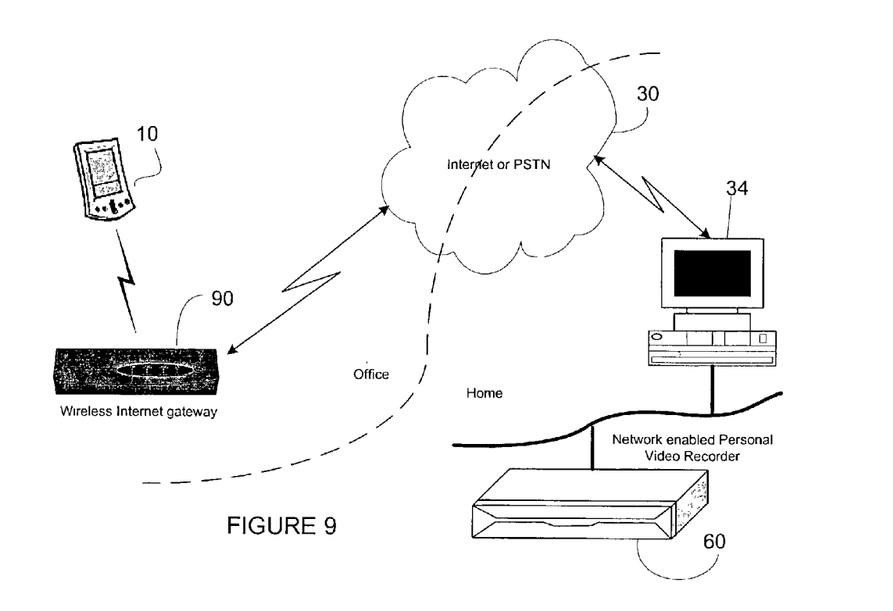
Figure 10:
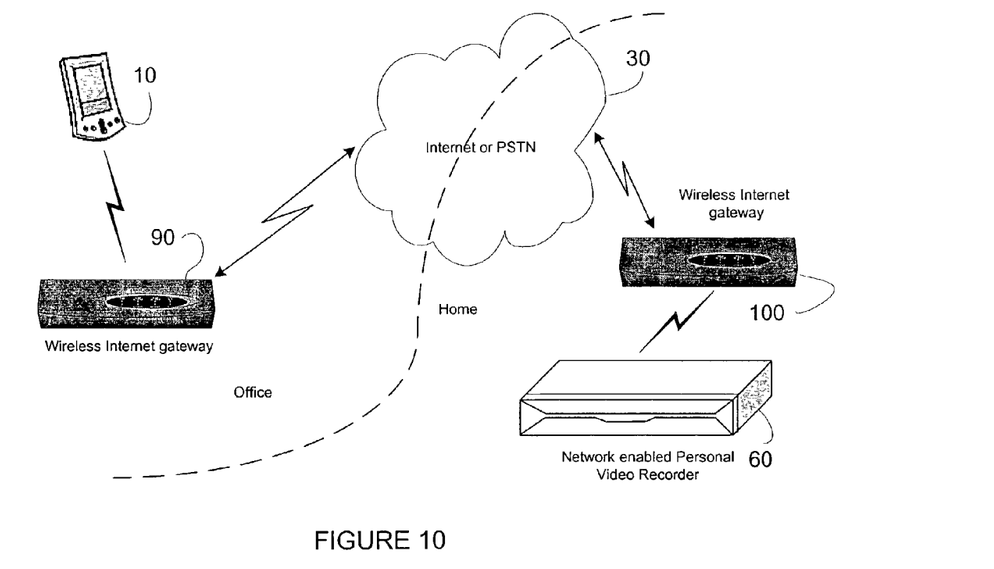
Figure 11:
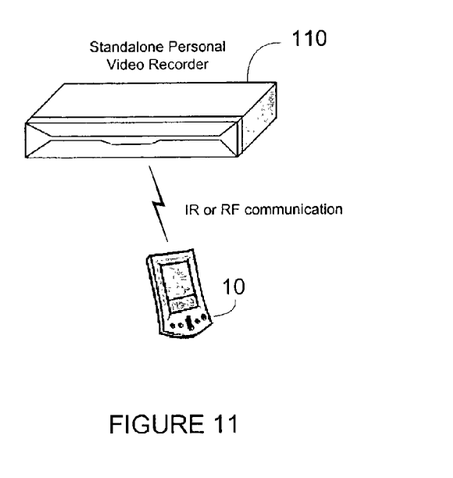

FIGS. 7 through 11 show alternative embodiments of networks employing this principle. In FIG. 7, the device 10 is in wireless communication with the computer 34, for example, as part of a Bluetooth personal area network where the device 10 becomes active when brought into the house. Such a configuration is also possible using IEEE 802.11 technology. FIG. 8 shows how the device 10 may be docked at a remote computer 80 (e.g. in the consumer's office) which acquires the recording schedule request data and transfers it via the Internet 30 to the consumer's home computer 34 where it is processed as described previously. FIG. 9 shows a similar arrangement except that in this case the office system includes a wireless Internet gateway device 90 which is used by the device 10 to directly transfer the recording schedule request data to the Internet 30 and thereby to the computer 34. FIG. 10 shows an arrangement similar to FIG. 9 except in this case both ends are equipped with wireless Internet gateways and the device 10 transfers the recording schedule request data directly to the recording appliance 60. Still further, FIG. 11 shows a system in which a recording appliance 110 is not network capable. In this case, the device 10 transfers the recording schedule request data directly to the recording appliance 110 when it is brought into proximity to the recording appliance 110, using either infrared or RF wireless communication. Transfer in this case may be manually initiated by the consumer, triggered automatically (for example, by the device 10 sensing it has been brought into range of a Bluetooth personal area network of which the recording appliance 110 is also a member), may be automatically initiated at a user-selected fixed time each day, etc. While specific embodiments of the invention have been described in detail, it will be appreciated by those skilled in the art that various modifications and alternatives to those details could be developed in light of the overall teachings of the disclosure. For example, it will be appreciated that while a PVR was utilized in the illustrative example set forth above, in fact any appliance capable of recording program material, including the computer itself, may be scheduled in this manner. In addition, it will be appreciated that the device can be setup such that an indication to a record a program can be accomplished by allowing a consumer to directly select a program from the guide without the need for providing a pop-up window or additional graphical user interface selection elements. Accordingly, the particular arrangement disclosed is meant to be illustrative only and not limiting as to the scope of the invention which is to be given the full breadth of the appended claims and any equivalents thereof. All of the references cited herein are hereby incorporated by reference in their entirety.

What is claimed is:

1. A method performed in a portable device to enable a user to effect recording of a program, the method comprising:
   displaying to a user in a display of the portable device a program guide including a listing for the program;
   in response to receiving input from the user requesting that the program be recorded, storing in a memory of the portable device data indicative of the recording request; and
   causing the portable device to provide the data indicative of the recording request stored in the memory to an appliance capable of effecting a recording program in response to the portable device establishing communication with the appliance.

2. The method as recited in claim 1, further comprising displaying a graphical user interface element by which the user can request that the program be recorded.

3. The method as recited in claim 2, wherein the graphical user interface element is displayed in a pop-up window that includes information related to the program.

4. The method as recited in claim 1, further comprising downloading the data indicative of the recording request to a personal computer capable of communicating with the appliance.

5. The method as recited in claim 1, further comprising downloading the data indicative of the recording request directly to the appliance.

6. The method as recited in claim 5, further comprising establishing a wireless communication connection with the appliance.

7. The method as recited in claim 6, wherein the wireless communication connection utilizes RF transmissions.

8. The method as recited in claim 6, wherein the wireless communication connection utilizes IR transmissions.

9. The method as recited in claim 1, further comprising downloading the program guide to the portable device from a server.

10. The method as recited in claim 9, further comprising using user registration information to determine the content within the program guide.

11. The method as recited in claim 10, wherein the user registration information comprises a geographic designator.

12. The method as recited in claim 11, wherein the geographic designator comprises a zip code.

13. The method as recited in claim 10, wherein the user registration information comprises a selection of a service provider.

14. The method as recited in claim 1, further comprising displaying a plurality of appliances and accepting input from the user specifying one of the plurality of appliances to effect the recording.

15. The method as recited in claim 1, wherein the portable device is a PDA.

16. The method as recited in claim 1, wherein the program guide includes textual and graphical information.

17. The method as recited in claim 1, wherein the appliance comprises an appliance adapted to record the program on a magnetic medium.

18. A readable media in a portable device having instruction for enabling a user to effect recording of a program, the instructions performing steps comprising:
   displaying to a user in a display of the portable device a program guide including a listing for the program;
   in response to receiving input from a user requesting that the program be recorded, storing in a memory of the portable device data indicative of the recording request; and
   causing the portable device to provide the data indicative of the recording request stored in the memory to an appliance capable of effecting a recording of the program in response to the portable device establishing communication with the appliance.

19. The readable media as recited in claim 18, wherein the instructions further display a graphical user interface element by which the user can request that the program be recorded.

20. The readable media as recited in claim 19, wherein the graphical user interface element is displayed in a pop-up window that includes information related to the program.

21. The readable media as recited in claim 18, further comprising instructions for downloading the data indicative of the recording request to a personal computer capable of communicating with the appliance.

22. The readable media as recited in claim 18, further comprising instructions for downloading the data indicative of the recording request directly to the appliance.

23. The readable media as recited in claim 22, wherein the instructions establish a wireless communication connection with the appliance.

24. The readable media as recited in claim 23, wherein the wireless communication connection utilizes RF transmissions.

25. The readable media as recited in claim 23, wherein the wireless communication connection utilizes IR transmissions.

26. The readable media as recited in claim 18, further comprising instructions for downloading the program guide from a server.

27. The readable media as recited in claim 18, wherein the portable device is a PDA.

28. The readable media as recited in claim 18, wherein the program guide includes textual and graphical information.

29. The readable media as recited in claim 18, wherein the appliance comprises an appliance adapted to record the program on a magnetic medium.

* * * * *